July 5, 1966  A. N. BUDD  3,258,797
FLUTELESS SWAGING TAP
Filed Nov. 6, 1964  2 Sheets-Sheet 1
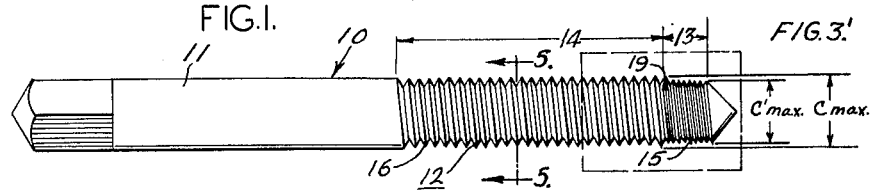
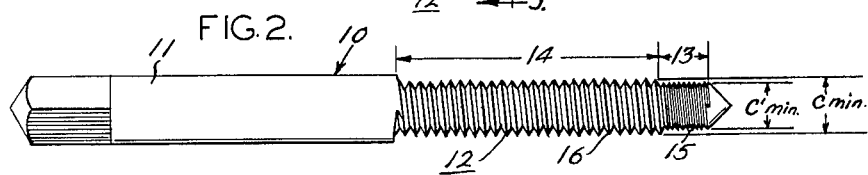
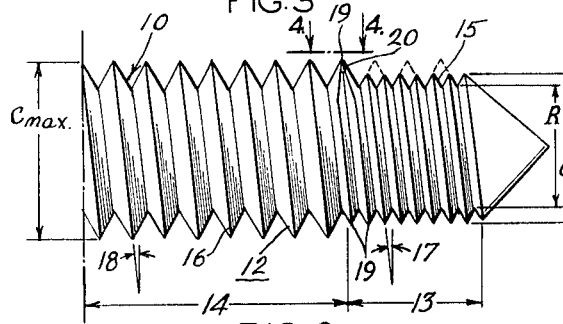
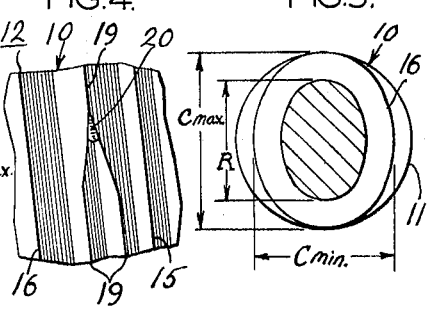
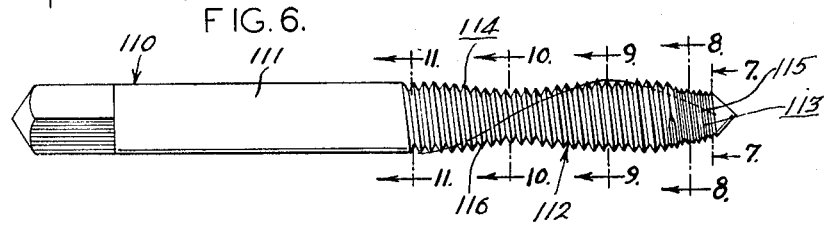
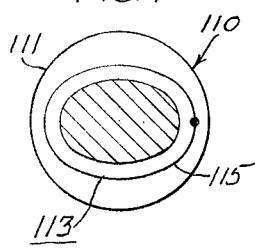
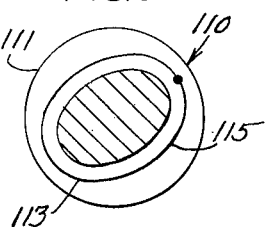
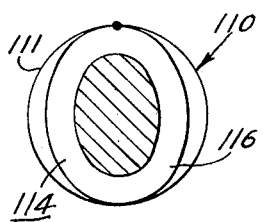
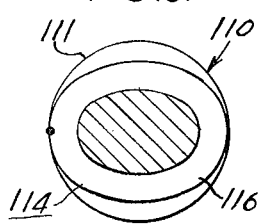
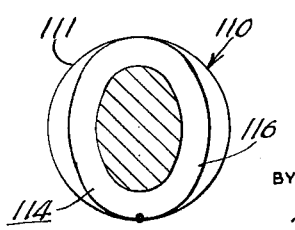
INVENTOR:
ALFRED N. BUDD
BY Howson & Howson
ATTYS.

July 5, 1966 A. N. BUDD 3,258,797
FLUTELESS SWAGING TAP
Filed Nov. 6, 1964 2 Sheets-Sheet 2
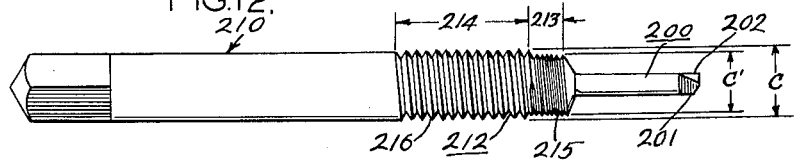
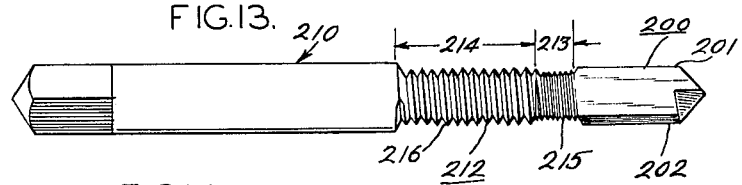
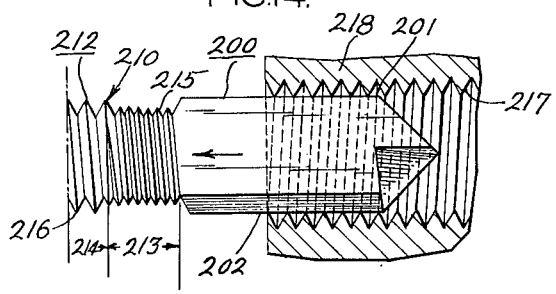
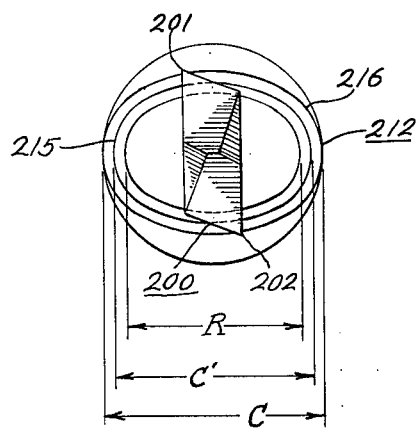
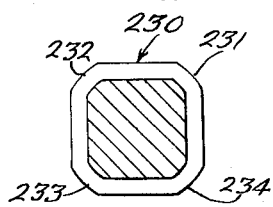
INVENTOR:
ALFRED N. BUDD
BY Howson & Howson
ATTYS.

United States Patent Office 3,258,797
Patented July 5, 1966

3,258,797
FLUTELESS SWAGING TAP
Alfred N. Budd, Wyndmoor, Pa., assignor to Bremer Manufacturing Company, Philadelphia, Pa., a corporation of Pennsylvania
Filed Nov. 6, 1964, Ser. No. 409,373
15 Claims. (Cl. 10—152)

The present invention relates to swaging tools for forming threads, and more particularly relates to fluteless taps of the type utilized in forming interior threads in a ductile material.

Taps may be divided into two classifications, notably, cutting taps having fluted body portions and radially disposed cutting faces, and forming or swaging taps. The advantage of the forming tap over the cutting tap is that taps of the latter type cause the formation of chips and/or burrs which must be removed from the workpiece after tapping. This requires a subsequent operation which, of course, adds to the cost of the finished article. On the other hand, forming taps cause plastic deformation of the material being tapped so that the material flows between the threads of the tap. However, taps of the swaging or forming type are beset with additional problems not encountered in cutting type taps. For example, as the material is being formed rather than cut, additional torque is required on the tap so as to form the internal threads. Further, even though it has been the practice in the manufacture of forming taps to chamfer the forward or leading end of the tap so as to permit gradual deformation of the material being tapped, as is true also of the forward or leading end of a cutting tap, a major problem exists as to starting a forming tap to form a threaded hole. Further, taps of the forming type have been found to produce a ridge at the entrance of the hole in the workpiece, which ridge may require removal if the tapped workpiece is to be mated surface to surface with another part. Thus, in a manner similar to the cutting tap, an additional step is required in order to arrive at a finished part.

With the above in mind, it is an object of the present invention to provide a forming tap having a leading or tip portion which permits easy alignment of the tap axially of the hole to be tapped.

Another object of the present invention is to provide a forming tap which is relatively easy to start in any ductile material and which requires a minimum of torque to produce a satisfactory and finished internal thread in the workpiece being tapped.

Still another object of the present invention is to provide a swaging or forming tap which produces a minimum raised portion or ridge at the point of entry of the tap so as to permit avoidance of the necessity of removing the ridge from the finished workpiece.

Another object of the present invention is to provide a forming tap having an increased wear life.

Other objects and a fuller understanding of the invention may be had by referring to the following specification and claims taken in conjunction with the accompanying drawings, in which:

FIG. 1 is a profile view of a forming tap constructed in accordance with the present invention;

FIG. 2 is a plan view of the tap illustrated in FIG. 1;

FIG. 3 is an enlarged fragmentary profile view of that portion of the tap shown in dotted lines in FIG. 1 and labeled FIG. 3′;

FIG. 4 is an enlarged fragmentary view of a portion of the tap illustrated in FIG. 3 and taken along line 4—4 thereof;

FIG. 5 is an enlarged sectional view taken along line 5—5 of FIG. 1;

FIG. 6 is another embodiment of a forming tap constructed in accordance with the present invention;

FIGS. 7–11 are enlarged sectional views taken along lines 7—7, 8—8, 9—9, 10—10, and 11—11 respectively of FIG. 6;

FIG. 12 is a profile view of another forming tap constructed in accordance with the present invention;

FIG. 13 is a plan view of the tap illustrated in FIG. 12;

FIG. 14 is an enlarged fragmentary sectional view of a portion of the tap illustrated in FIGS. 12 and 13 and showing the tap being removed from a workpiece;

FIG. 15 is an enlarged end view of the tap illustrated in FIG. 13; and

FIG. 16 is a sectional view of a forming tap having a different peripheral outline than the taps illustrated in FIGS. 1–15.

At the outset it should be noted that although the illustrated embodiments of a forming tool shown in the drawings and as described hereinafter are of the V-thread type, a tool having "American National Screwthread," "Whitworth Standard Screwthread," "International System Standard Screwthreads," "Square Screwthreads," "Acme Form Thread," or other thread form constructed in accordance with any of the well-known standards such as "National Coarse Screwthread" or "National Fine Screwthread," may be used in accordance with the present invention.

Referring now to the drawings, especially FIG. 1 thereof, a thread forming tool, in the present instance an oval tap 10 having a shank 11 and a continuously threaded body 12 is illustrated therein. As noted in the drawings, the threaded body 12 is divided into a leading portion 13 having threads 15 of uniform depth and a trailing portion 14 having threads 16 of uniform depth.

In accordance with the invention, and as best illustrated in FIG. 3, the leading portion 13 of the tap 10 contains double the number of threads 15 per inch as the threads 16 of the trailing portion 14. Further, although the maximum crest diameter ($C_{max.}$) of the threads 16 is greater than the maximum crest diameter ($C'_{max.}$) of the threads 15, and although the minimum crest diameter ($C_{min.}$) of the threads 16 is greater than the minimum crest diameter ($C'_{min.}$) of the threads 15, the threads are constructed so that at least the working portion of the root diameter (R) of both the leading and trailing portions 13 and 14 respectively is substantially the same. It should be noted that it is common practice when forming swaging taps to relieve the non-working threaded portion by as much as .005″ which would mean that the end of the threaded body adjacent the shank could be tapered slightly by the afore-mentioned amount. Thus the requirement of "substantially" the same root diameter.

It is desirable, in order to permit the easy starting of the threads, and therefore the tap in a hole in a workpiece, that the helix angle 17 of the leading portion 13 be equal to the helix angle 18 of the trailing portion 14. To this end, the threads 15 of the leading portion 13 are most easily formed by first cutting the threads 16 longitudinally of the tap and then cutting the crest of at least the first of the threads 16 thus forming two threads 15 for every thread 16 (see FIG. 3). As may be seen in FIGS. 1–3, the threads 15 constituting the leading portion 13 of the tap 10 may extend for any length longitudinally of the tap and merge into the threads 16, thus providing the continuous threaded body 12. However, it is only necessary that there be at least one thread or one revolution of thread having the same root diameter (R) and helix angle 17 as the trailing portion 14 of the tap.

In addition, it is preferable in order to decrease the friction of the tap against the material of the work piece as it forms threads therein, to provide at least the leading portion 13 of the tap with an oval cross section. For ease of manufacture, however, the entire tap may have an oval form, as illustrated in FIGS. 1–5. The relationship of the maximum crest diameter ($C_{max.}$ and $C'_{max.}$) to the minimum crest diameter ($C_{min.}$ and $C'_{min.}$) is that $C_{min.}$ and $C'_{min.}$ should be equal to or greater than respectively $C_{max.}$ and $C'_{max.}$ less twice the respective tooth depths. Preferably, the relationship of the maximum crest diameters of both the leading and the trailing portion to the respective minimum crest diameters is that the minimum crest diameters should be greater than their respective major crest diameters less twice the tooth depth. This relationship of the maximum crest diameter to the minimum crest diameter of the leading and trailing portions is important as this relationship insures that at least the crests of the threads associated with the minor crest diameter will fall in the internal thread formed by the thread portion associated with the maximum crest diameter.

In addition, it should be recognized that in the tap 10, the first thread, at the point of merger between the threads 15 and the threads 16, is the working thread or the thread which causes the internal threads of the work piece to be formed. For purposes of identification, this thread is designated 19.

At this point it is desirable to define what is meant by helix angle as relating to the tap of the present invention. As shown in the drawings and as described above, double threads are formed in the leading portion 13 of the tap instead of the single thread formed in the trailing portion 14. Conventionally, when threads are formed on a cylinder having a circular cross section the lead or pitch (L) equals $2\pi r \tan \alpha$ where $r$ equals ½ the diameter of the pitch circle and $\alpha$ equals the helix angle. In an oval tap, where the lead is constant, the angle $\alpha$ constantly changes because of the change in the diameter, at any point, of the pitch circle. In addition, because of the change in the pitch diameter between the leading portion 13 and the trailing portion 14, by strict definition it is impossible for the text book definition of helix angle to remain a constant. However, even in the present instance, at any comparable point along the leading and trailing portion, the helix angle will be approximately or substantially the same, but some difference is to be noted.

In view of the definition of the tap as opposed to the text book definition of helix angle, helix angle must be redefined. Thus helix angle, for the purposes of this application means the angle formed between a plane perpendicular to the central axis of the tap and a line from any radial point on the plane to the central axis intersecting the central axis at a point equal to the lead of the screw thread, as measured along the axis, from the intersection of the plane and the axis. Therefore, using the same radial point on parallel planes located in the forward and trailing portions of the tap, will result, because of the identity of lead between these portions, in the same angle.

In accordance with another feature of the invention, it is preferable to merge a pair of the threads 15 into a single thread 16 at or near the point of maximum crest diameter ($C_{max.}$) of the oval. Further, it is preferable, for ease of forming internal threads in a ductible work piece, to provide a radially relieved portion 20 at the point of merger. The radially relieved portion 20 allows for smooth and even flow of the material of the work piece as the thread 19 engages to form the deep thread in the work piece.

In certain instances when it is desirable to tap deep holes in relatively thick castings, it may be desirable to place a twist longitudinally of the tap so as to provide a gradual relief when forming the threads. Such a tap 110 is illustrated in FIGS. 6–11 wherein the tap has a shank 111 and a threaded body 112. As illustrated in the drawings, the threaded body 112 is divided, as before, into a leading portion 113 having threads 115 and a trailing portion 114 having threads 116. As described above, any given cross section of the tap is oval in cross section. As illustrated in FIGS. 7–11, the oval cross section is twisted longitudinally of the tap, the twist being approximately 90° every ⅞ of an inch.

In certain instances, when tapping holes in very soft work pieces which tend to form burrs on the crest of the internal threads, it is desirable to provide means on the tap to remove the burrs upon withdrawing the tap from the work piece. To this end, a spade drill tip 200 is connected to a tap 210 having a threaded body 212, which body is divided into a leading portion 213 having threads 215 and a trailing portion 214 having threads 216. As described with relation to FIGS. 1–5, the leading portion 213 of the tap 210 contains double the number of threads per inch as the threads 216 of the trailing portion 214, while the helix angle of the threads of both the leading and trailing portions as well as the root diameter thereof remain the same. Further, although the maximum crest diameter (C) of the threads 216 is greater than the maximum crest diameter (C') of the threads 215, at least the leading portion 213, in the present instance the entire tap, is oval in cross section, the relationship of the maximum and minimum crest diameters being such as that heretofore described.

As noted in the drawings, the spade drill 200 has a pair of oppositely turned cutting edges 201 and 202 respectively, the diameter of the drill 200 being at least equal to the root diameter (R) but less than the maximum pitch diameter of the leading portion 213. In the present instance and as illustrated in FIG. 15, the diameter of the drill equals the root diameter. Thus, as noted in FIG. 14, upon withdrawal of the tap from a tap hole 217 of a work piece 218, the material that has flowed into the threads 216 of the tap 210 and formed burrs on the crests of the internal threads in the tapped hole 217, may be removed.

Another form of a tap 230 constructed in accordance with the present invention is illustrated in cross section in FIG. 16. Again, the tap 230 utilizes the principle of double the number of threads on the leading portion of the tap while providing the tap with a uniform helix angle and root diameter on the threads throughout which permits easier starting of the tap in any kind of metal. It has been found that by providing a square tap and radially relieving the maximum diametrical corners of the tap, such as at 231, 232, 233, and 234 a stronger tap is formed.

In summation, an improved forming or swaging tool is provided having a continuously threaded body which is divided into a leading and trailing portion, the leading portion having double the number of threads as the trailing portion but having a uniform helix angle throughout the threaded body portion. Further, although the maximum crest diameter of the leading portion is less than the crest diameter of the trailing portion, the root diameter of the threads of both the leading and trailing portion is identical. The tool thus provides ease of starting when forming threads in a ductile material while necessitating low torque to produce a finished thread. In addition, because of the smaller crest diameter of the leading portion and the greater number of threads, a minimum of "ridging" occurs at the entrance of the tap into a hole.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. Apparatus for swaging threads, comprising a thread-forming tool having a continuously threaded body, said threaded body being divided into a leading portion and a trailing portion, said leading portion having double the number of threads per inch as the threads per inch of said trailing portion, the helix angle of said threads being substantially uniform throughout said body.

2. Apparatus for swaging threads in accordance with claim 1 wherein said root diameter of said leading and trailing portion is substantially the same.

3. Apparatus for swaging threads in accordance with claim 1 wherein said threads of said trailing portion have a greater crest diameter than the corresponding crest diameter of said leading portion.

4. Apparatus for swaging internal thread in accordance with claim 3 wherein at least said leading portion is oval in cross section.

5. Apparatus for swaging threads in accordance with claim 4 wherein said trailing portion is oval in cross section and wherein the maximum crest diameter of said trailing portion less twice the thread depth is equal to or less than the minimum crest diameter of said trailing portion.

6. Apparatus for swaging threads in accordance with claim 4 wherein the maximum crest diameter of said leading portion less twice the thread depth is equal to or less than the minimum crest diameter of said trailing portion.

7. A swaging tool for forming internal threads comprising a tap having a shank and a continuously threaded body, said threaded body being divided into a leading portion and a trailing portion, said leading portion having double the number of threads per inch as the threads per inch of said trailing portion, the helix angle and the root diameter of said threads being substantially uniform throughout said body.

8. A swaging tool in accordance with claim 7 wherein said threads of said trailing portion have a greater crest diameter than the corresponding crest diameter of said leading portion.

9. A swaging tool in accordance with claim 8 wherein at least said leading portion of said tap is oval in cross section.

10. A swaging tool in accordance with claim 9 wherein said traling portion is oval in cross section and wherein the maximum crest diameter of said trailing portion less twice the thread depth is equal to or less than, the minimum crest diameter of said trailing portion.

11. A swaging tool in accordance with claim 9 wherein the maximum crest diameter of said leading portion less twice the thread depth is equal to or less than the minimum crest diameter of said leading portion.

12. A swaging tool in accordance with claim 7 wherein said tap is oval in cross section and wherein said threaded body is twisted longitudinally thereof.

13. A swaging tool in accordance with claim 7 wherein said threaded body is oval in cross section and said leading portion has connected thereto, at the extended terminal end thereof, a spade drill.

14. A swaging tool in accordance with claim 13 wherein the diameter of said drill is equal to or greater than said root diameter but less than the maximum pitch diameter of said leading threaded portion.

15. A swaging tool in accordance with claim 7 wherein said tap has a square cross section and wherein said maximum diameters of said tap are radially relieved.

References Cited by the Examiner

UNITED STATES PATENTS

| | | | |
|---|---|---|---|
| 21,960 | 11/1858 | Hickok | 10—141 X |
| 1,475,561 | 11/1923 | Bath et al. | 10—140 |
| 2,991,491 | 7/1961 | Welles | 10—152 |
| 3,180,202 | 4/1965 | Kahn | 10—152 X |

ANDREW R. JUHASZ, *Primary Examiner.*